Jan. 5, 1960

R. B. MATTHEWS 2,920,248

TEMPERATURE RESPONSIVE CONTROL DEVICE

Filed Jan. 16, 1956

INVENTOR.
Russell B. Matthews
BY
Seegert & Schwalbach
Attorneys

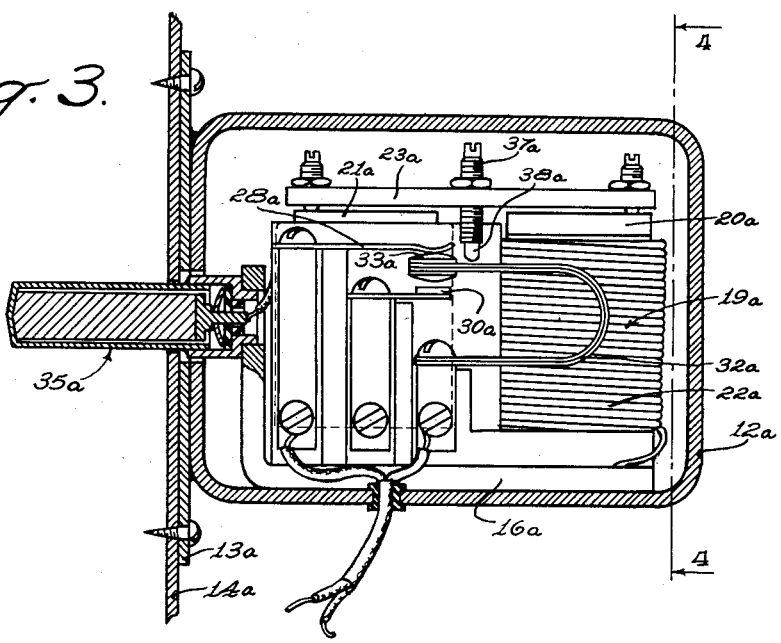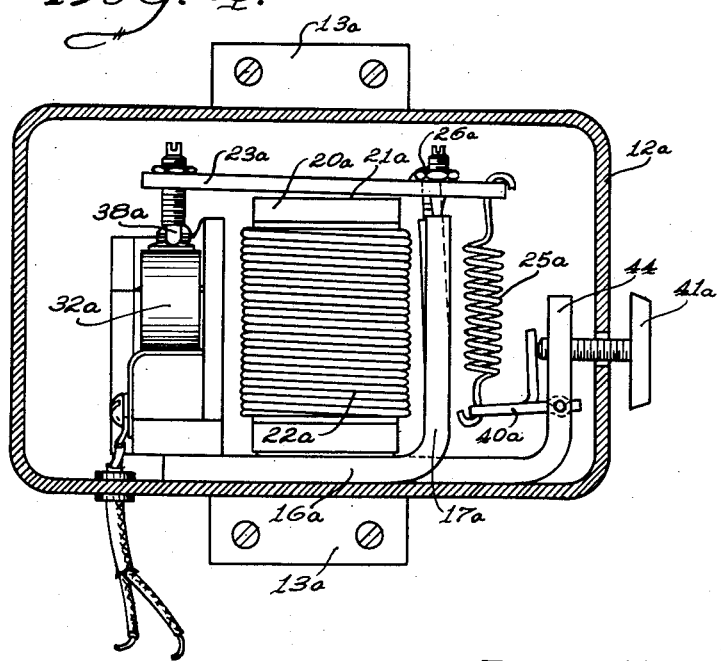

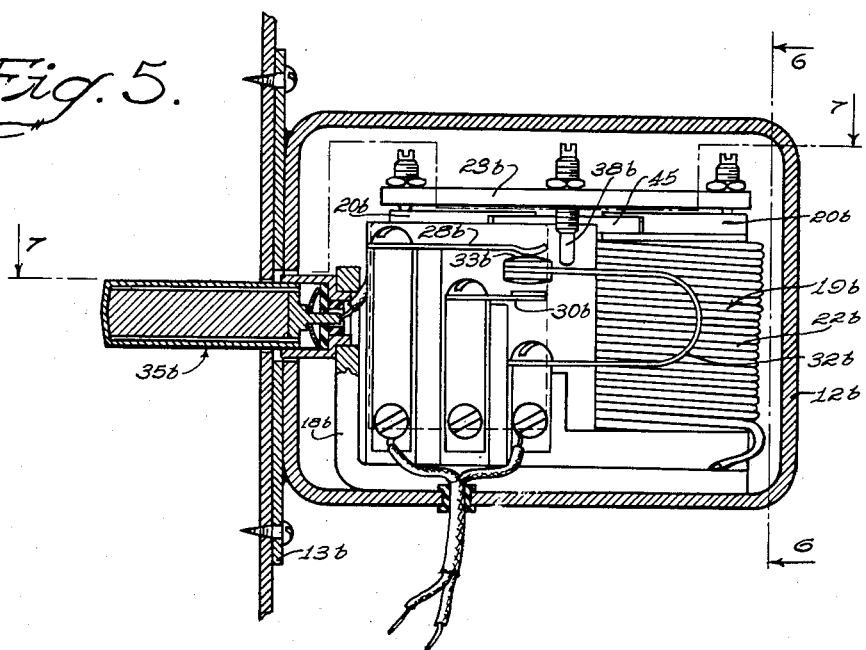
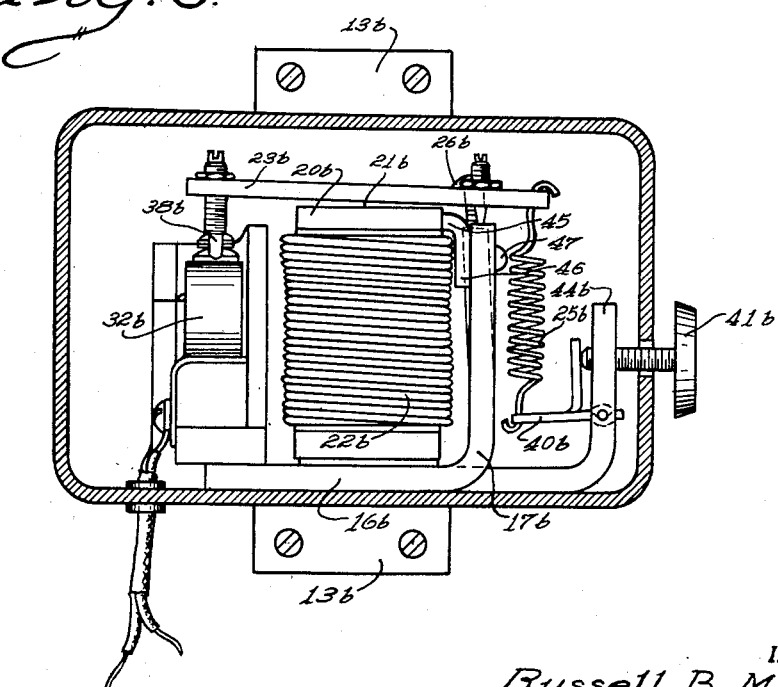

Jan. 5, 1960   R. B. MATTHEWS   2,920,248
TEMPERATURE RESPONSIVE CONTROL DEVICE
Filed Jan. 16, 1956   4 Sheets-Sheet 4

INVENTOR.
Russell B. Matthews
BY
Seegert & Schwalbach
Attys

United States Patent Office 2,920,248
Patented Jan. 5, 1960

2,920,248

TEMPERATURE RESPONSIVE CONTROL DEVICE

Russell B. Matthews, Wauwatosa, Wis., assignor to Baso Inc., Milwaukee, Wis., a corporation of Wisconsin Application January 16, 1956, Serial No. 559,215

11 Claims. (Cl. 317—131)

This invention relates to improvements in temperature responsive control devices and more particularly to limit controls.

In the control of certain equipment, for example heating equipment, it is desirable to provide control devices for effecting shut-off of said equipment in the event of occurrence of an extreme condition, for example an extreme temperature. The type of control device with which the present invention is concerned takes the form of a relay adapted to be connected to the equipment to be controlled, and a thermoelectric generator connected in circuit with said relay, and having a first thermojunction, for example a hot junction, for exposure to the temperature to be sensed. The aforementioned generator also has at least one other thermojunction, for example a cold junction disposed within a zone of different, for example cooler, temperature. Desirably the generator is operable to energize and actuate the relay whenever the temperature sensed by the first thermojunction reaches a predetermined extreme level. Variations in the temperature at the other thermojunction, however, vary the output of the generator for a given temperature at the first thermojunction, and when this occurs the control point of the device shifts from the aforemenioned predetermined extreme temperature level. Such a shift may be to a dangerous temperature level, and when this occurs, the control device fails to afford the proper protection.

With the above in mind it is a general object of the present invention to provide an improved control device of the self-generating type including an electroresponsive operator and a thermoelectric generator operable to energize and actuate said operator when the temperature sensed by one thermojunction of said generator reaches a predetermined extreme level, said device including means for insuring uniform response of said operator to subjection of said thermojunction to said predetermined extreme temperature in spite of substantial temperature variations at the other thermojunctions thereof tending to vary the temperature differential and thereby the output of said generator.

Another object of the invention is to provide an improved control device of the aforementioned character wherein the thermoelectric generator has at least one semi-metallic element and is operable to actuate the electroresponsive operator in response to a relatively small differential between the thermojunctions at the opposite ends of said element.

An important object of the invention is to provide a temperature responsive control device of the character described wherein the means for insuring uniform response of the control device to subjection of one of the thermojunctions thereof to the predetermined temperature in spite of substantial variations in the temperature at the other thermojunctions comprises temperature responsive means subject to substantially the same temperature as said one thermojunction for varying the magnitude of thermoelectric energy required to actuate the electroresponsive operator in accordance with the variations in temperature at the other thermojunctions.

A more specific object of the invention is to provide an improved control device of the class described wherein the electroresponsive operator comprises an electromagnet and a cooperable armature biased toward a retracted position and movable on predetermined energization of said operator to an attracted position against said bias, said operator being subjected to the substantially the same temperature as the cold junctions of the thermoelectric generator, and said biasing means being operable to vary the bias on said armature in response to a variation in the temperature to which said operator and cold junctions are subjected.

Still another object of the invention is to provide an improved control device of the character described wherein the electroresponsive operator is provided with means for varying the attractive force exerted on the armature by the electromagnet per unit of energization of said electromagnet as the temperature to which said operator and the cold junctions of the generator varies.

Other objects and advantages of the invention will become apparent as the description proceeds, reference being had to the accompanying drawings illustrating three forms of the invention and wherein:

Figure 3 is a view similar to Figure 1 illustrating another form of the invention;

Figure 4 is a vertical sectional view taken approximately along the line 4—4 of Figure 3;

Figure 5 is a vertical sectional view similar to Figures 1 and 3 illustrating still another form of the invention;

Figure 6 is a vertical sectional view taken approximately along the line 6—6 of Figure 5.

Figure 1:
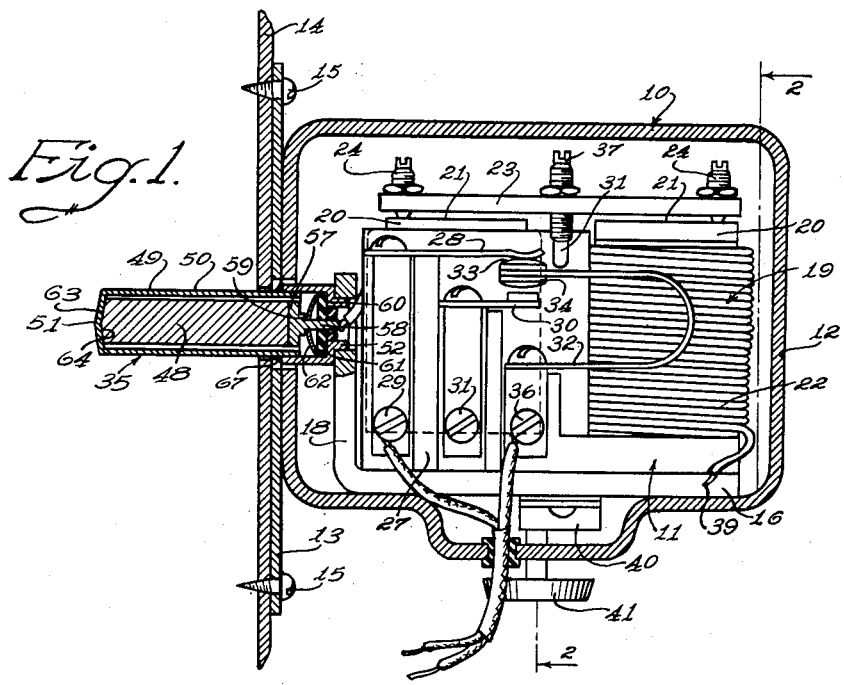
Figure 1 is a vertical sectional view of one form of the invention.
Figure 2:
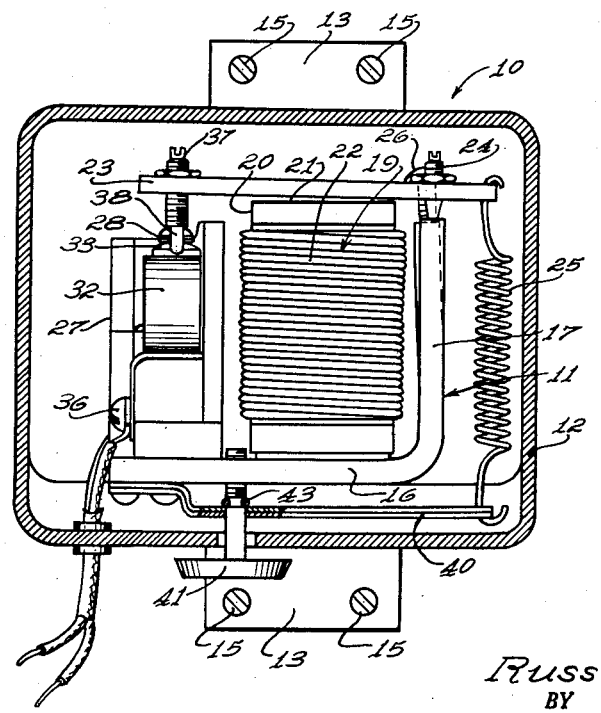
Figure 2 is a vertical sectional view taken approximately along the line 2—2 of Figure 1.

In Figures 1 and 2 the improved control device illustrated is indicated by the numeral 10 and includes a relay 11 and a thermoelectric generator 35 preferably in a unitary assemblage. The relay 11 is enclosed within a casing 12 having a suitable aperture through which the generator 35 projects, and said casing may be provided with a mounting bracket 13 for attachment, for example to the wall 14 of an enclosure containing a medium, the temperature of which is to be sensed by the improved control device. The bracket 13 may be provided with suitable apertures for attaching screws 15 as shown.

The relay 11 may comprise a frame 16 comprising a base plate having an upstanding bracket arm 17 at one side thereof, and having an upstanding bracket arm 18 at an adjacent side thereof. Mounted on the frame 16 is an electromagnet 19 comprising a generally U-shaped core 20 having substantially coplanar pole faces 21 and having an energizing winding 22 wound on the legs of said core. An armature 23 is cooperable with the pole faces 21 and is provided with pivot screws 24 having pointed tips tiltably seated on suitable recesses formed in the adjacent end of the bracket arm 17 as shown. A tension spring 25 biases the armature 23 away from the pole faces 21, and a limit screw 26 threaded into an angularly offset end portion of the bracket 17 extends through a suitable slot in the armature 23 and has an enlarged head engageable by said armature to limit the retracted movement thereof with respect to the pole faces 21.

Also mounted on the relay frame 16 is a contact mounting and terminal block 27 of insulating material. Mounted on the block 27 is a resilient contact arm 28 and a terminal 29 therefor. A contact arm 30 having a terminal 31 may also be mounted on the insulating block 27. A resilient generally U-shaped blade 32 carries a contact 33 which it biases toward engagement with the contact arm 28, and the arm 32 may also carry a back contact 34 for cooperation with contact 30, the bias of the arm 32 being operable to bias the contact 34 away from the contact 30. The contact arm 32 is provided with a terminal 36 which, with the contact 29 affords means for connection of the contacts 33 and 28 respectively to a circuit to be controlled thereby, said circuit being illustrated only fragmentarily by the conductors connected to said terminals and extending externally of the casing 12. The armature 23 carries a screw 37 having an insulating tip 38 which engages the arm 32 adjacent the contacts 33 and 34 as shown. The bias of the contact arm 32 aids the spring 25 in biasing the armature 23 away from pole faces 21.

The thermoelectric generator 35 is provided to supply the relay winding 22 with energizing current as will hereinafter appear. The generator 35 illustrated comprises a tubular member 52 of brass or other suitable material having a reduced end portion received within a suitable aperture in the bracket 18, as by a press fit. The generator 35 also comprises a pair of thermocouple element means 48 and 49, the latter of which takes the form of an elongated generally cup-shaped sheath member, preferably of stainless steel. The sheath 49 has a tubular sleeve portion 50 and an end wall portion 51, the opposite end of the member 49 being telescopically received within the tubular member 52 and fixed therein, as by silver soldering or brazing at 67.

The thermocouple element means 48 preferably comprises a rod-like or cylindrical ingot of semi-metallic alloy or composition disposed in coaxial spaced relation within the sheath 49. Because the thermocouple element means 48 is of frangible material, the generator 35 is constructed in a manner to provide shock resistant mounting means therefor. The element means 48 includes an iron contact electrode 57 having a stem portion 58 formed with a shoulder 59. The tube 52 is formed with an internal annular shoulder 60, and surrounding the contact electrode stem portion 58 is an insulating washer 61 engaging the shoulder 60. Interposed between the insulating washer 61 and the stem shoulder 59 is a compression spring 62 which may take the form of a concavo-convex centrally apertured resilient disc also surrounding the electrode stem 58.

The sheath 49 is formed with a conical inner end wall surface 63, and the semi-metallic element 48 is formed with a complementary conical end wall surface 64 which is seated against the end wall surface 63. The spring 62 exerts compressive stresses on the element 48, which stresses substantially reduce the net tensile stresses to which said element is subjected during transverse acceleration or shock, said compressive stresses not being so high as to exceed the compressive strength of said element. The bias of the spring 62 also provides the pressure necessary for a satisfactory pressure contact between the element 48 and the sheath 49 at the surfaces 63 and 64. The pressure type contact is not deleteriously effected by deformation of the element 48, for example on bending under transverse shock, and the conical nature of the surfaces 63 and 64 tends to maintain the biased element 48 in centered relationship within the tubular portion 50 of the member 49. The compressive stress under which the member 48 is placed increases the magnitude of deformation which said element can withstand without fracture and affords the generator 35 substantial shock resistance.

The thermocouple element 48 may, for example, be formed of a semi-metallic alloy or composition which may be characterized as a binary metallic compound of slightly imperfect composition, i.e. containing beneficial impurities constituting departures from perfect stoichiometry by reason of an excess of one of the metals over the other, and/or containing added beneficial impurity substances hereinafter referred to as "promoters." Such semi-metallic compositions have semi-conductor like conductance, both electrical and thermal, and include mixtures of such binary metallic compounds, which may be denominated ternary metallic alloys or compositions. Certain of these alloys or compositions exhibit negative and certain exhibit positive electrical characteristics.

More specifically, the thermocouple element 48 may, for example, be formed of an alloy further described in the copending application of Sebastian Karrer, Serial No. 475,540, filed December 15, 1954, and assigned to the assignee of the present invention, and now Patent No. 2,811,570, said alloy comprising lead and at least one member of the group tellurium, selenium and sulphur.

In order to utilize any of the aforementioned base alloys or promoted compositions in electrical devices, for example as thermoelectric generator elements, they must necessarily be electrically contacted. As previously pointed out, electrical contact with the ingot 48 is made at one end with the inner wall surface 63 by means of a pressure contact. The electrical contact with the ingot at the opposite end, however, is made by bonding of the contact electrode 57 with the end surface of the ingot 48, and if desired, the aforementioned pressure contact can be replaced by such a bonded contact. In the latter case the element-electrode interface must have a mechanical strength at least comparable to that of the alloy of which the element 48 is made. The contact electrode must be chemically stable with respect to the element 48 and provides the necessary means for connecting said element into its electrical circuit while at the same time chemically isolating said element from the other conductors making up said circuit. Iron is especially adapted for use as contact electrode material for elements 48 of lead-tellurium-selenium compositions, and pressure type contacts of carbon are suitable for elements 48 of any of the aforedescribed compositions including those comprising lead and sulphur.

Since, as is well known in the art, the electrical and thermal resistance of the thermoelectric generator 35 are dependent upon the configuration thereof as well as on the electrical and thermal conductivities of the elements 48 and 49, the relationship between the dimensions of each element can be obtained which affords the highest thermal conversion efficiency in such a mounting or assembly. In the embodiment described, the thermal conductivity of the semi-metallic element 48 is low as compared with that of the element 49 (for example .025 watt/cm./° C. as compared to .261 watt/cm.° C.).

For elements of any given thermal and electrical conductivities, the conversion efficiency depends strongly upon the ratio of thickness of the sheath 49 to the radius of the element 48, or more specifically, upon the cross-sectional area of the tube. In the embodiment illustrated, this ratio of the radius of the element 48 to the thickness of the sheath 49 is preferably about 6 to 1 or more.

It is understood, of course, that the conversion efficiency of the thermocouple is also dependent upon the difference between the hot and cold junction temperatures. For thermocouples utilizing a semi-metallic inner element having a low thermal conductivity, high temperature differences can be achieved by selecting for the semi-metallic element a ratio of length to diameter, which in the exemplary embodiment herein disclosed is about 4 to 1, such that radiation transfer of heat from the surface of the inner element to the sheath establishes substantial temperature gradients within the inner element, particularly near the hot junction. When this is done, the heat flux into the inner element through the hot junction, i.e. the juncture of the faces 63 and 64, is exhausted to the case over the entire side wall surface of the inner element, allowing the inner cold junction, i.e. the juncture of the element 48 with the contact electrode 57, to assume a temperature only slightly greater than that of the outer cold junction, i.e. the juncture of the element 49 and sleeve 52. A further consequence of such radiative cooling is the reduced electrical resistance of the semi-metallic element 48, said element having a positive temperature coefficient of resistance. The radiation responsible for the removal of the heat transmitted across the hot junction takes place between the element 48, its cold junction electrode 57, and the metal walls of the element 49 and extension tube 52. Since the cold junction temperature under such circumstances is dependent upon the temperature of its environment, it is desirable to keep the ambient temperature low. The extension of the sheath to a cooler zone, as by the tube 52 into the casing 12 provides a heat sink which aids in cooling the casing around the cold junctions.

One end of the energizing winding 22 is connected in circuit with the contact electrode stem 58, and the other end of said winding is connected in circuit with the tube 52, as by being grounded to the frame 16 at 39. The improved thermoelectric generator 35 is characterized by unusually high efficiency and produces sufficient thermoelectric energy to effect attractive movement of the armature 23 and corresponding disengagement of the contact 33 with the contact 28 in response to a relatively low temperature differential between the hot and cold junctions thereof. Thus, the improved control device is well adapted for use as a high or low temperature limit control in relatively low temperature applications, for example as a high temperature limit control responsive to the temperatures within the bonnet of the furnace. In such an application the hot junction at the juncture of surfaces 63 and 64 may be disposed within the bonnet of the furnace, and the cold junctions at the juncture of the members 49 and 52 and of members 48 and 57 may be disposed externally of the wall 14 within the casing 12.

Substantial changes in the temperature surrounding the casing 12, i.e. externally of the bonnet wall 14, tend to change the temperature at the cold junctions of the generator 35 and thereby vary the output of said generator by varying the differential between the hot and cold junctions thereof. Such a variation in temperature, unless compensated for, prevents the generator 35 from actuating the relay 19 uniformly in response to a predetermined extreme temperature at the hot junction. Thus, an extremely dangerous situation could occur wherein the hot junction of the generator may be subjected to a temperature dangerously above the aforementioned predetermined extreme temperature without actuating the relay 19.

To prevent such an occurrence, the present invention provides means for varying the magnitude of electrical energy required to effect actuation of the relay 19 in accordance with changes in the ambient temperature to which the casing 12 is subjected, reducing said requirement as the ambient temperature increases and tends, by heating the cold junctions of the generator, to reduce the output of said generator. Thus, ambient temperature variations are compensated for and the relay 19 is uniformly actuated in response to subjection of the hot junction of the generator to a predetermined extreme temperature, despite substantial variations in the temperature to which the casing 12 is subjected.

In the form of the invention illustrated in Figures 1 and 2, the temperature compensating means takes the form of a bi-metal arm 40 fixed at one end to the frame 16 and having its other end connected to the tension spring 25. A manual adjustment screw 41 projects through the casing 12 and is threaded into frame 16 as shown, and carries shoulder means, which may take the form of a snap ring 43 disposed within a groove in said screw, engageable with the bi-metal arm 40 as shown. It will be observed that rotation of the screw 41 adjusts the bias exerted by the spring 25 on the armature 23. The bi-metal arm 40 is of such a character that it deforms toward the armature 23 in response to an increase in temperature to thereby reduce the bias on the armature 23 so that said armature can be actuated to attracted position by a lower value of electrical energization of the relay coil 22. The reduced bias on the armature 23 matches the pull-in current value of the relay 19 to the reduced output of the generator 35 resulting from the increased temperature surrounding the casing 12, so that the relay 19 continues to be uniformly actuated in response to the desired predetermined extreme temperature within the bonnet to which the hot junction of the generator is subjected.

The form of the invention illustrated in Figures 3 and 4 is similar in all respects to that shown in Figures 1 and 2 except as noted hereinafter, and the parts indicated by reference numerals with the suffix *a* indicate parts corresponding to those in Figures 1 and 2 indicated by the same reference characters without a suffix. In the form of the invention shown in Figures 3 and 4, the manual adjustment screw 41a projects through a suitable aperture in the casing 16a and is threaded into a bracket 44 projecting from the frame member 16a. A bell crank arm 40a is pivoted to the bracket 44, and one arm thereof is engaged by the manual screw 41a, whereas the other arm thereof is connected to one end of the tension spring 25a. Rotation of the adjustment screw 41a varies the bais on the armature 23a.

In Figures 3 and 4 variation of the bias on the armature 23a in accordance with changes in the ambient temperature is afforded by having the resilient U-shaped contact arm 32a formed of bi-metallic material of such a character that on an increase in temperature of said bi-metal arm, the end thereof adjacent the contact 33a tends to deform downwardly, as viewed in Figure 3, to thereby reduce the bias exerted on the armature 23a by said arm. As in Figures 1 and 2, the bias on the armature 23a is reduced sufficiently by a given rise in temperature within the casing 16a to match the pull-in current value of the relay 19a to the reduced output of the generator 35a produced by said rise in temperature for a given extreme temperature at the hot junction of the generator 35a. Thus, the relay 35a is actuated uniformly in response to exposure of the hot junction of the generator 35a to a predetermined extreme temperature.

Figure 7:
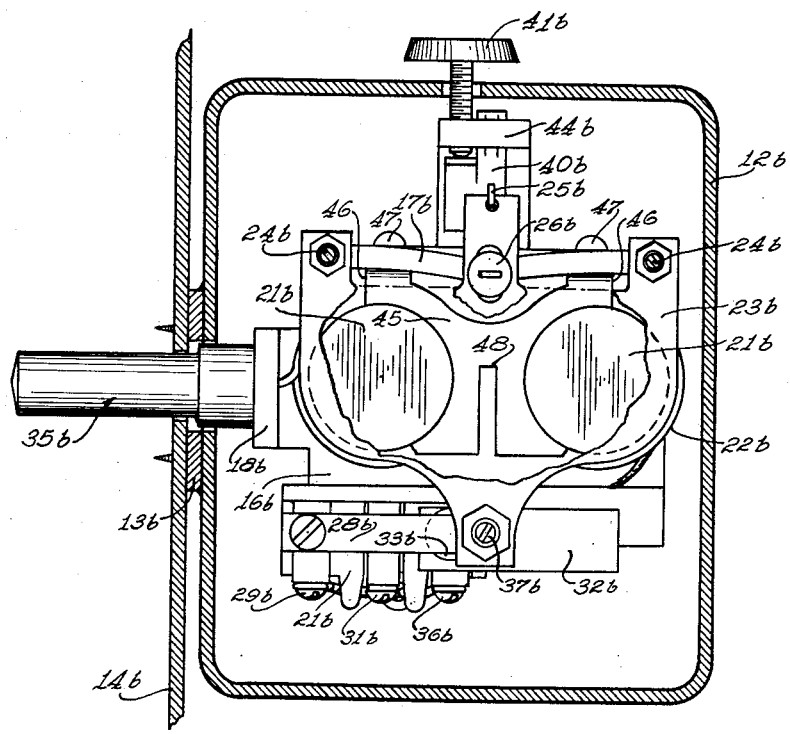
Figure 7 is a sectional plan view taken approximately along the line 7—7 of Figure 5.

Still another form of the invention is illustrated in Figures 5 to 7, the parts in said figures indicated by reference characters bearing the suffix *b* corresponding to similar parts in Figures 1 and 2 indicated by the same reference characters without a suffix and in Figures 3 and 4 by reference characters bearing the suffix *a*.

In Figures 5 to 7 the contact structure is substantially the same as that of the form of the invention shown in Figures 1 and 2, and the manually adjustable spring biasing means is substantially identical to that shown in Figures 3 and 4. In the form of the invention shown in Figures 5 to 7 ambient temperature compensation is afforded by a magnetic shunt 45 which takes the form of a plate having lugs 46 by which it is affixed to the bracket 17b, as by rivets 47. The plate 45 is shaped to conform to the contour of the end portions of the magnetic frame 20b adjacent the pole faces 21b, as shown, and is in good flux conducting engagement therewith. The plate 45 may be formed with a slot 48 to afford an area of limited cross-section which is the effective cross-section of said plate in its operation as a magnetic shunt.

The plate 45 is preferably made of a temperature sensitive magnetic material whose permeability changes inversely and linearly with changes in temperature, for example within the range of 40° to 120° F. Certain iron-nickel alloys have the property of affording a substantially linear curve of permeability per degree temperature change and of affording a low range of currie points. These alloys are available commercially, and it is preferable to use alloys with a nickel content of 28.5% to 32.5%.

In the operation of the form of the invention shown in Figures 5 to 7 the plate 45 shunts a portion of the flux generated by energization of the winding 22b from one end of the core 20b adjacent one pole face 21b to the other end of said core adjacent the other pole face 21b, this shunted flux being ineffective to exert any attractive force on the armature. The shunt 45 is of such a character that as the temperature to which it is subjected rises, its permeability decreases, and therefore the amount of flux shunted thereby also decreases, so that a larger amount of flux per unit of electrical energization of the winding 22b is available to link the armature 23b for magnetic attraction thereof. Since the shunt 45 is subjected to substantially the same temperature as the cold junctions of the generator 35b, said shunt affords temperature compensation for variations in the ambient temperature at said cold junctions.

As a specific example of the operation of the form of the invention shown in Figures 5 to 7, when the temperature surrounding the casing 16b rises and the output of the generator 35b is thereby reduced by lowering of the differential between its hot and cold junctions for a given predetermined high limit temperature at the hot junction thereof, the shunt 45, by virtue of its decreased permeability, increases the attractive force exerted by the electromagnet 19b on the armature 23b per unit of energizing current afforded by the generator 35b. Thus, the armature is uniformly pulled in to attracted position, and the contacts 28b and 33b disengage on exposure of a hot junction of the generator 35b to a predetermined extreme temperature.

Conversely, a drop in the temperature to which the casing 16b is subjected increases the temperature differential between the hot and cold junctions of the generator 35b for a given hot junction temperature, thereby increasing the output of said generator. However, the permeability of the shunt 45 increases with the aforementioned drop in temperature, so that less flux from the coil 22b is available to link the armature 23b per unit of energizing electrical energy supplied to said winding by the generator 35b. Thus, the efficiency of the relay 19b is lowered by the decrease in ambient temperature, and is raised by an increase in said temperature to compensate for the increase in output of the generator 35b with a lowering in the temperature of its cold junctions and the decrease in output of said generator produced by an increase in the temperature at its cold junctions.

The specific illustrations and corresponding descriptions are used for the purpose of disclosure only, and are not intended to impose unnecessary limitations on the claims, or to confine the patented invention to a particular use. It is apparent that other changes and modifications may be made without departing from the spirit of the invention, and all of such changes are contemplated as may come within the scope of the appended claims.

What is claimed as the invention is:

1. In a thermostat having electroresponsive control means, means for sensing the temperature of a medium and electrically actuating said electroresponsive control means at a predetermined temperature thereof comprising, a thermoelectric generator affording the sole source of energizing current for said control means having a first junction for sensing the temperature of said medium and having a reference junction, and means subject to the temperature of said reference junction operatively associated with said electroresponsive control means for varying the magnitude of energizing current required for actuation thereof in accordance with variations in the temperature of said reference junction to thereby afford said thermostat compensation insuring response thereof to said predetermined temperature sensed by said first junction irrespective of variations in said reference junction temperature.

2. In a thermostat having electroresponsive control means, means for sensing the temperature of a medium and electrically actuating said electroresponsive control means at a predetermined control point temperature thereof comprising, a thermoelectric generator affording the sole source of energizing current for said control means having a first junction for sensing the temperature of said medium and having a reference junction, means subject to the temperature of said reference junction operatively associated with said electroresponsive control means for varying the magnitude of energizing current required for actuation thereof in accordance with variations in the temperature of said reference junction to thereby afford said thermostat compensation insuring response thereof to said predetermined control point temperature sensed by said first junction irrespective of variations in said reference junction temperature, and means for adjusting said control point temperature.

3. In a thermostat having electroresponsive control means, means for sensing the temperature of a medium and electrically actuating said electroresponsive control means at a predetermined temperature thereof comprising, a thermoelectric generator affording the sole source of energizing current for said control means having a first junction for sensing the temperature of said medium and having a reference junction, said generator including a semi-metallic thermoelement, and means subject to the temperature of said reference junction operatively associated with said electroresponsive control means for varying the magnitude of energizing current required for actuation thereof in accordance with variations in the temperature of said reference junction to thereby afford said thermostat compensation insuring response thereof to said predetermined temperature sensed by said first junction irrespective of variations in said reference junction temperature.

4. In a thermostat having electroresponsive control means biased toward a given position, means for sensing the temperature of a medium and electrically actuating said electroresponsive control means against its bias at a predetermined temperature of said medium comprising, a thermoelectric generator affording the sole source of energizing current for said control means having a first junction for sensing the temperature of said medium and having a reference junction, and means comprising a bimetallic element subject to the temperature of said reference junction for varying the bias of said control means and thereby the magnitude of the energizing current required for actuation of said electroresponsive control means in accordance with variations in reference junction temperature to thereby afford said thermostat compensation insuring response thereof to said predetermined temperature sensed by said first junction irrespective of variations in said reference junction temperature.

5. In a thermostat having electroresponsive control means including an electromagnetic winding and an armature biased toward a given position, means for sensing the temperature of a medium and energizing said winding for actuating said armature against its bias at a predetermined control point temperature of said medium, said means comprising, a thermoelectric generator affording the sole source of energizing current for said control means having a first junction for sensing the temperature of said medium and having a reference junction, means comprising a bimetallic element subject to the temperature of said reference junction and operatively associated with said armature for varying the bias thereof and thereby the magnitude of the energizing current required for actuation of said armature in accordance with variations in reference junction temperature to thereby afford said thermostat compensation insuring response thereof to said predetermined control point temperature sensed by said first junction irrespective of variations in said reference junction temperature, and means affording selective adjustment of said control point temperature comprising means for manually varying the bias on said armature.

6. In a thermostat having electroresponsive control means including a control member and biasing means therefor, means for sensing the temperature of a medium and energizing said electroresponsive control means at a predetermined temperature thereof to actuate said control member against said biasing means from one to another of its controlling positions, said means comprising, a thermoelectric generator affording the sole source of energizing current for said control means having a first junction for sensing the temperature of said medium and having a reference junction, and means affording said thermostat compensation insuring response thereof to said predetermined temperature sensed by said first junction irrespective of variations in said reference junction temperature comprising a bimetallic arm affording mounting means for the biasing means and being subject to the temperature of said reference junction to vary the mounting of said biasing means and hence the bias afforded by said biasing means to thereby vary the magnitude of the energizing current required for actuation of said control member in accordance with variations in the temperature of said reference junction.

7. In a thermostat having electroresponsive control means including a stationary contact and a movable contact biased to a given position with respect to said stationary contact, means for sensing the temperature of a medium and energizing said electroresponsive control means at a predetermined temperature thereof to actuate said movable contact against its bias, said means comprising a thermoelectric generator affording the sole source of energizing current for said control means having a first junction for sensing the temperature of said medium and having a reference junction, and means affording said thermostat compensation insuring response thereof to said predetermined temperature sensed by said first junction irrespective of variations in said reference junction temperature comprising a bimetallic contact carrier for said movable contact subject to the temperature of said reference junction to vary the bias on said movable contact and thereby the magnitude of the energizing current required for actuation of said movable contact in accordance with variations in the temperature of said reference junction.

8. In a thermostat having an electromagnet and an armature therefor, means for sensing the temperature of a medium and electrically energizing said electromagnet at a predetermined temperature thereof to effect movement of said armature from one to another position comprising, a thermoelectric generator affording the sole source of energizing current for said electromagnet having a first junction for sensing the temperature of said medium and having a reference junction, temperature responsive magnetic flux shunting means associated with said electromagnet to vary in accordance with variations in the temperature of said reference junction the magnetic flux flow through said armature, and thereby the magnitude of the energizing current required for actuation of said armature, thereby affording said thermostat compensation insuring response thereof to said predetermined temperature sensed by said first junction irrespective of variations in said reference junction temperature.

9. In a thermostat having electroresponsive control means including a control member and biasing means therefor including spring means having one end thereof fixed to said control member, means for sensing the temperature of a medium and energizing said electroresponsive control means at a predetermined control point temperature thereof to actuate said control member from one to another of its positions against the biasing force of said spring means, said means comprising, a thermoelectric generator affording the sole source of energizing current for said control means having a first junction for sensing the temperature of said medium and having a reference junction, a bimetallic arm having a stationary end portion and a movable end portion fixed to the biasing spring for said control member, said bimetallic arm being subject to the temperature of said reference junction to vary the bias on said control member and thereby the magnitude of the energizing current required for actuation of said control member against said bias in accordance with variations in the temperature of said reference junction, to afford said thermostat compensation insuring response thereof to said predetermined temperature sensed by said first junction irrespective of variations in said reference junction temperature, and means associated with said bimetallic arm for adjusting said control point temperature.

10. In a thermostat having electroresponsive control means including a stationary contact and a movable contact biased to a given position with respect to said stationary contact, means for sensing the temperature of a medium and electrically actuating said electroresponsive control means at a predetermined control point temperature thereof comprising, a thermoelectric generator affording the sole source of energizing current for said control means having a first junction for sensing the temperature of said medium and having a reference junction, a bimetallic contact carrier for said movable contact subject to the temperature of said reference junction to vary the bias on said movable contact and thereby the magnitude of the energizing current required for actuation of said movable contact against said bias in accordance with variations in the temperature of said reference junction, to afford said thermostat compensation insuring response thereof to said predetermined temperature sensed by said first junction irrespective of variations in said reference junction temperature, and means for adjusting said control point temperature.

11. In a thermostat having electromagnetic path means including an electromagnet and an armature therefor, means for sensing the temperature of a medium and electrically energizing said electromagnet at a predetermined control point temperature thereof to effect movement of said armature from one to another position comprising, a thermoelectric generator affording the sole source of energizing current for said electromagnet having a first junction for sensing the temperature of said medium and having a reference junction, temperature responsive magnetic flux shunting means associated with said electromagnetic path means to vary, in accordance with variations in the temperature of said reference junction, the magnetic flux flow through said armature and thereby the magnitude of the energizing current required for movement of said armature to afford said thermostat compensation insuring response thereof to said predetermined temperature sensed by said first junction irrespective of variations in said reference junction temperature, and means for adjusting said control point temperature.

References Cited in the file of this patent

UNITED STATES PATENTS

| | | |
|---|---|---|
| 1,202,392 | Jepson | Oct. 24, 1916 |
| 1,440,879 | Lee | Jan. 2, 1923 |
| 1,745,149 | Carney | Jan. 28, 1930 |
| 2,125,627 | Fonseca | Aug. 2, 1938 |
| 2,183,855 | Mansky | Dec. 19, 1939 |
| 2,470,864 | Ray | May 24, 1949 |